Figure 1:
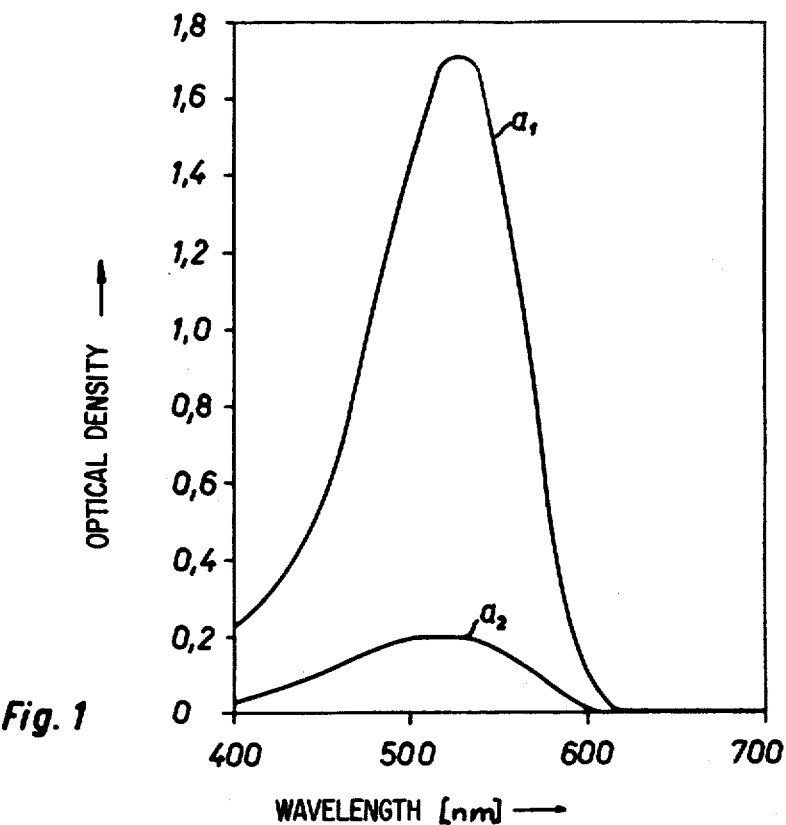

United States Patent [19]

Osman et al.

[11] 4,137,193

[45] Jan. 30, 1979

[54] UTILIZATION OF DYES FOR LIQUID CRYSTAL DISPLAYS

[75] Inventors: Maged A. Osman, Zürich; Terry J. Scheffer, Forch, both of Switzerland

[73] Assignee: BBC Brown, Boveri & Company, Limited, Baden, Switzerland

[21] Appl. No.: 809,276

[22] Filed: Jun. 23, 1977

[30] Foreign Application Priority Data

Jun. 23, 1976 [CH] Switzerland ............ 7996/76

[51] Int. Cl.$^2$ ............ G02F 1/13; C09K 3/34
[52] U.S. Cl. ............ 252/299; 252/408; 350/349
[58] Field of Search ............ 252/299, 408; 350/160 LC, 349

[56] References Cited

U.S. PATENT DOCUMENTS

| | | | |
|---|---|---|---|
| 3,597,044 | 8/1971 | Castellano | 252/299 |
| 3,703,329 | 11/1972 | Castellano | 252/299 |
| 3,833,287 | 9/1974 | Taylor et al. | 252/299 |
| 3,864,022 | 2/1975 | Moriyama et al. | 252/299 |
| 3,960,750 | 6/1976 | Moriyama et al. | 252/299 |
| 3,960,751 | 6/1976 | Moriyama et al. | 252/299 |
| 4,032,219 | 6/1977 | Constant et al. | 252/299 |
| 4,032,470 | 6/1977 | Bloom et al. | 252/299 |
| 4,048,088 | 9/1977 | Yaguchi et al. | 252/299 |

FOREIGN PATENT DOCUMENTS

| | | | |
|---|---|---|---|
| 2627215 | 1/1977 | Fed. Rep. of Germany | 252/299 |
| 1459046 | 12/1976 | United Kingdom | 252/299 |

OTHER PUBLICATIONS

White, D. L., et al, J. Appl. Phys., vol. 45, No. 11, pp. 4718-4723 (1974).
Blinov, L. M., et al., J. Phys. (Paris), vol. 36, C-1, No. 3, pp. 69-76 (1975).
Bloom, A., et al., Mol. Cryst. Liq. Cryst., vol. 40, pp. 213-221 (1977).
Bloom, A., et al., Mol. Cryst. Liq. Cryst., vol. 41, pp. 1-4 (Aug. 1977).

*Primary Examiner*—Benjamin R. Padgett
*Assistant Examiner*—T. S. Gron
*Attorney, Agent, or Firm*—Oblon, Fisher, Spivak, McClelland & Maier

[57] ABSTRACT

In a cholesteric guest-host liquid crystal composition having a positive dielectric anisotropy and consisting of a nematic host component with a dye incorporated as a guest component therein and an optically active (cholesteric) component, the improvement consisting of a substantially stable and water insoluble azo dye guest component having a pleochroic ratio $a_1/a_2$ of at least 6.5 and an absorption maximum in the range of from 350 to 700 nm, said azo dye being a compound of the formula (1)

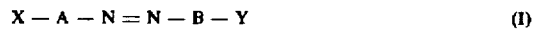

$$X - A - N = N - B - Y \qquad (1)$$

wherein A is selected from the group consisting of 1,4-phenylene, 2-hydroxy-1,4-naphthylene and 2-hydroxy-8-amino-1,4-naphthylene; B is selected from the group consisting of 1,4-phenylene, 1,5-naphthylene and 5-substituted benzothiazo-(1,3)-2-yl; X is selected from the group consisting of nitro, nitrile, dimethylamino, di(hydroxyethyl)-amino, phenyl and straight chain $C_1$–$C_{10}$ alkyl, and Y is a monovalent organic radical that does not promote water solubility in the dye molecule.

13 Claims, 2 Drawing Figures

UTILIZATION OF DYES FOR LIQUID CRYSTAL DISPLAYS

This invention is concerned with the utilization of dyes for liquid crystal displays whose liquid crystalline substance has a positive dielectric anisotropy and contains nematic compounds with embedded dye molecules and an optically active additive.

The incorporation of pleochroic dye molecules in the nematic liquid crystal of electrooptical cells and the resulting interactions that can be obtained are known under the description "guest-host interactions" (see H. H. Heilmeier, et al, Molecular Crystals and Liquid Crystals, vol. 8, pages 293–304, 1969) and have found technical applications (see, for example, the German patent disclosure DT-OS No. 1,928,003). The dichroic or pleochroic dyes used for this purpose are dissolved in the nematic liquid crystal which serves as a "matrix" for the orientation of the dye molecules in an electric field. In contrast to the standard monochroic dyes, the amount of light absorbed by pleochroic dyes depends upon the orientation of the dye molecules with respect to the electric field vector of the incident light. Application of an electric field to a thin layer of the liquid crystal material in a cell reorients the nematic liquid crystal molecules of the bulk as well as the embedded dye molecules and causes a change in the amount of light absorbed by the layer.

In the past this effect was employed in connection with parallel-oriented, field-effect cells but could be scarcely made use of since the resulting contrast that could be obtained was inadequate for a commercial liquid crystal display. Moreover, polarizing layers were required for these cells.

A recent development in liquid crystal display technology (D. L. White and G. N. Taylor, "New Absorptive Mode Reflective Liquid Crystal Display Device" in the Journal of Applied Physics, vol. 45, pages 4718–4723, 1974) avoids the necessity of the polarizing layers through the use of optically active additives in the bulk liquid crystal. Liquid crystal displays that function according to this principle have become known as "cholesteric guest-host displays". For example through addition of 5 to 15% of an optically active material such as the amyl ester of cyanobenzylideneaminocinnamic acid to an ordinary nematic liquid crystal, a structure is produced where, in the absence of an electric field, the molecular axes of the liquid crystal compounds in the display cell are helicoidally arranged in such a way that the helicoidal axis is perpendicular to the molecular axes. Under the influence of an electric field the liquid crystal molecules can orient themselves along the electric field direction so that the optical properties, e.g. the transmittance of the liquid crystal layer that is "doped" with embedded dye molecules, changes in such a way that can be detected with the eye even without polarizers. In the present context, the embedding phase or "host" phase will be referred to as the liquid crystal bulk phase. Such a system is, for example, described in the German patent disclosure No. DT-OS 2,410,557 together with the embedding phenomena associated with the utilization of pleochroic dyes.

A number of pleochroic and dichroic dyes have been proposed in the German patent disclosure mentioned above as well as in other publications (German patent disclosures No. DT-OS 1,928,003, DT-OS 2,310,733, DT-OS 2,345,794, DT-OS 2,410,557, and the literature references mentioned previously) for utilization in liquid crystal displays based on the guest-host effect. However, these dyes were not found to be suitable for the commercial production of liquid crystal displays because the resulting display contrast was insufficient and the stability required for continuous operation was too low.

In particular, earlier experiments leading to the present invention showed that the required display contrast could be achieved only if the pleochroic ratio of the dye/liquid crystal system lies above a certain critical value and that the dyes must also fulfill certain stability criteria.

The dyes of this invention that are used in displays whose liquid crystal has a positive dielectric anisotropy and contains embedded dye molecules and an optically active additive, i.e. cholesteric guest-host systems, satisfy a number of criteria. At least one azo compound is utilized as the dye which has a pleochroic ratio $a_1/a_2$ of over 6.5, has an absorption maximum somewhere in the region from 350–700 nm, and is stable under conditions of an applied ac voltage of 20 volts at a temperature of 100° C., as well as in the ultra-violet radiation found in daylight.

The pleochroic ratio of the dye/liquid crystal system is defined as the ratio of the extinction coefficient or absorbance value $a_1$, measured when the preferred axis of the dye/liquid crystal mixture lies parallel to the electric field vector (E-vector) of the illumination, to the extinction coefficient or absorbance value $a_2$, measured when the preferred axis is perpendicular to the E-vector of the illumination.

The $a_1$ and $a_2$ values can be determined photometrically using standard procedures such as are described, for example, in the literature reference mentioned previously. (Journal of Applied Physics, vol. 45, pages 4718–4721, 1974.)

The invention therefore offers new selection criteria for the utilization of pleochroic dyes in liquid crystal displays that have a nematic component and an optically active additive, namely cholesteric guest-host displays. These criteria make it possible to improve the quality of the display, especially with regard to contrast and brightness.

A brief description of the attached figures follows:

FIG. 1 gives the absorption spectra $a_1$ and $a_2$ of an azo compound used in this invention. The optical density is plotted along the ordinate and the wavelength is plotted along the abscissa.

Figure 2:
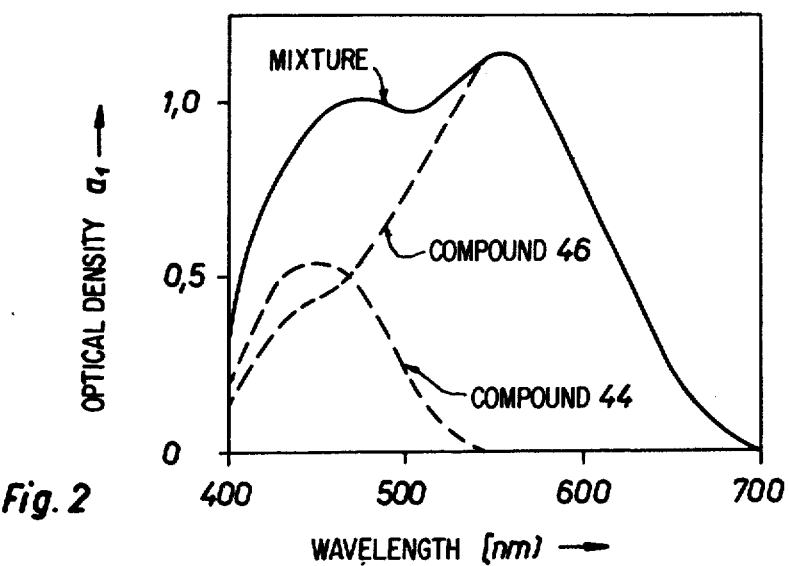

FIG. 2 gives the absorption spectra of two azo compounds used in this invention, both separately and mixed together. The optical density $a_1$ is plotted along the ordinate and the wavelength is plotted along the abscissa.

The azo compounds used according to this invention can be suitably described by the general formula (1)

$$X-A-N=N-B-Y \qquad (1)$$

where A represents 1,4-phenylene, 2-hydroxy-1,4-naphthylene, or 2-hydroxy-8-amino-1,4-naphthylene radicals; B represents 1,4-phenylene, 1,5-naphthylene, or 5-subsuituted benzothiazo(1,3)-2-yl radicals; X represents the hydrogen atom, or nitro, nitrile, dimethylamino, di(hydroxyethyl)-amino or phenyl groups or a straight chain alkyl radical having up to 10 carbon atoms; and Y represents a monovalent organic radical that does not promote water solubility in the dye molecule.

Y could, for example, also signify N-mono or N,N-disubstituted amino groups with suitable substituents being straight chain alkyl groups having 1–10 carbon atoms, acylamino groups with a total of up to 10 carbon atoms preferably in a straight chain, or phenyl or benzoylamino groups. Y can also symbolize an acrylazo or an acrylazoaryl radical whose aryl radical contains 6 or 10 ring carbon atoms and can carry 1,3 substituents such as chlorine atoms, hydroxyl or amino groups. Other possibilities for Y could be an alkoxy radical such as a methoxy radical, or a heterocyclic aryl radical such as 5-methylbenzothiazo(1,3)-2-yl.

Further special examples for Y could be the 2'-hydroxy-1'-naphthyl-4-azophenyl, 2'-hydroxy-8'-aminonaphthyl-1'-azo-4-phenyl, 3,5-dichloro-4-hydroxy-1-phenylazo, or the 2-hydroxy-1-naphthylazo radicals as well as the 4-alkoxy-1-phenylmethinazo and 4-alkyl-1-phenylazo radicals whose alkyl groups preferably do not contain more than 10 carbon atoms in a straight chain such as, for example, methyl or n-butyl groups.

Examples for compounds having the formula (1) are listed in the attached Table I where X, Y, A, and B are specified. The structural formulas corresponding to these compounds are summarized on the formula page.

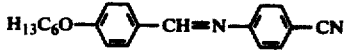

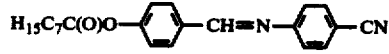

A value of 8.6 was measured for the pleochroic ratio $a_1/a_2$ for a 1% by weight concentration of this dye in a 15 μm thick liquid crystal layer at a wavelength of 520 nm corresponding to the maximum in the absorption spectrum.

In the turned-off or field-free state of a liquid crystal cell containing this mixture the dye molecules are essentially randomly oriented and the reflectivity of the cell in this state $R_{off}$ is given by $$R_{off} = 10^{2/3 (a_1 - 2a_2)}$$

When the electric field is turned on in the cell the dye molecules orient along the field and the reflectivity $R_{on}$ or the brightness B in this state is given by $$R_{on} = B = 10^{-2a_2}$$

The contrast ratio C of the cell is determined by the

TABLE I

| | | X—A—N=N—B—Y | | |
|---|---|---|---|---|
| No. | A | B | X | Y |
| 37 | 1,4-Phenylene- | 1,4-Phenylene- | H | 2-Hydroxy-1-naphthylazo- |
| 391 | " | " | H | 3,5-Dichloro-4-acyloxy-1-phenylazo- |
| 431 | " | " | H | 4-Alkoxy-1-phenyl-methinazo- (Methoxy-) |
| 3 | " | " | Nitro- | Amino- |
| 31 | " | " | " | Benzoylamino- |
| 321 | " | " | " | Acylamino- (Hexanoyl-) |
| 52 | " | " | " | Dimethylamino- |
| 481 | " | " | Nitrile- | Monoalkylamino- (Methyl-) or Phenylamino- |
| 51 | " | " | " | Dimethylamino- |
| 411 | " | " | Alkyl-(Butyl) oder Phenyl- | Amino-, Acylamino-, Benzoylamino- |
| 441 | " | " | Dimethylamino- | Amino-, Acylamino-, Benzoylamino- |
| 6 | " | 5-subst. Benzothiazo(1,3)-2-yl- | Di(2-hydroxyethyl)-amino- | Methoxy- |
| 54 | " | 1,4-Phenylene- | Dimethylamino- | 5-Methylbenzothiazo(1,3)-2-yl- |
| 34 | 2-Hydroxy-1,4-naphthylene- | 1,4-Phenylene- | H | 2'-Hydroxy-1'-naphthyl-4-azophenyl- |
| 45 | " | 1,5-Naphthylene- | H | 2-Hydroxy-1-naphthylazo- |
| 47 | " | 1,4-Phenylene- | H | 5-Methylbenzothiazo(1,3)-2-yl- |
| 421 | " | " | H | 4-Alkyl-1-phenylazo- |
| 46 | 2-Hydroxy-8-amino-1,4-naphthylene- | " | H | 2'-Hydroxy-8'-amino-naphthyl-1'-azo-4-phenyl- |

Azo compounds having the formula (1) can be utilized according to this invention either as single dyes added to the bulk liquid crystal or as dye mixtures with each other or other dyes. Generally such systems are preferred where it is possible to switch from a colored or black state to a white state.

FIG. 1 shows an example of the pleochroic absorption spectra ($a_1$ and $a_2$) of an azo compound employed as an embedded dye according to this invention. (This compound is listed as number 6 on the formula page where its structure is given.) The spectra was measured with the dye dissolved in the host phase that is described in the Journal of Applied Physics, vol. 45, page 4718, 1974. This phase is composed of the following three components:

ratio $R_{on}/R_{off}$ which leads to the expression $$C = B^{1 (1 - a_1/a_2)}$$

This final expression shows that a bright, high-contrast display requires a high pleochroic ratio which, according to this invention, must be larger than 6.5. The relationship between the pleochroic ratio $a_1/a_2$ and the contrast ratio C is elucidated in the following table for a display which has an $R_{on}$ value of 28.5%.

| Pleochroic ratio $a_1/a_2$ | Contrast ratio C |
|---|---|
| 10 | 43.2 |
| 8 | 18.7 |
| 6.5 | 10.0 |
| 4 | 3.5 |
| 2 | 1.5 |

An example of a suitable mixture of two azo compounds that is utilized as a dye as is described in this invention is elucidated by reference to FIG. 2. The structural formulas of the azo compounds (Nos. 44 and 46) are given on the formula page. They are employed together in proportions corresponding to 0.17% of azo compound No. 44 and 2.54% of azo compound No. 46 in the total weight of the bulk liquid crystal with the dyes. The remaining components of the bulk liquid crystal correspond to the state-of-the-art that has been discussed in the foregoing sections.

The dashed lines give the separate absorption spectra of each of the two azo compounds, and the unbroken curve gives the absorption spectrum of the mixture of the azo compounds in their specified proportions in the nematic bulk measured in a 10 μm thick layer. The absorption coefficient (optical density) of the mixture as a whole follows a course that is high and relatively flat over a large portion of the visible spectrum, which bestows a neutral, grey color to the display.

The azo compounds of formula (1) which are utilized as dyes in this invention, as well as any other pleochroic or non-pleochroic dyes which are employed in conjunction with these dyes normally should have adequate solubility in the bulk liquid crystal. This solubility criterium is fulfilled when the compound to be used as the dye has a solubility of over 1% by weight at 20° C. in a test mixture composed of p-[(p-n-propylbenzylidene)-amino]-benzonitrile and p-[(p-n-hexylbenzylidene)-amino]-benzonitrile.

The absorption maximum of the compounds to be utilized can either be determined using standard techniques or taken from the literature. The adherance of the compounds to the stability conditions mentioned earlier is best checked in a cell of the intended type under conditions of continuous operation. The chemical, optical, and electrical properties (and changes in there properties) must be considered as stability parameters.

General as well as special formulas for the compounds of formula (1) that are utilized according to this invention are grouped together on the following formula pages. In the general formulas R and R' signify the same or different n-alkyl groups with 1-10 carbon atoms or the phenyl radical.

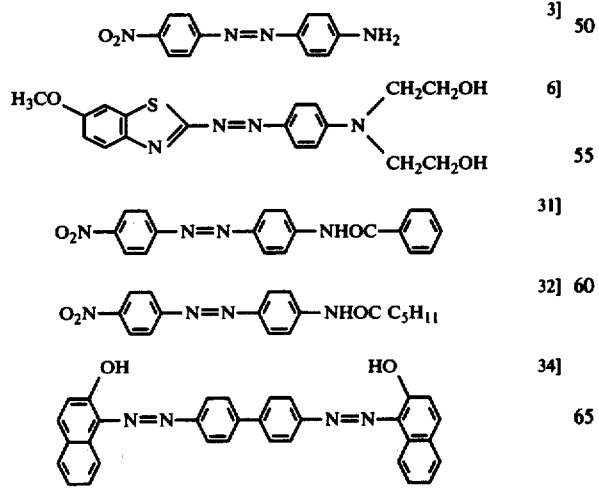

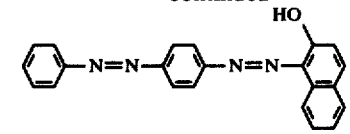

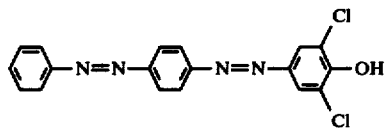

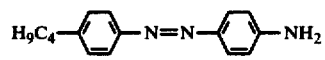

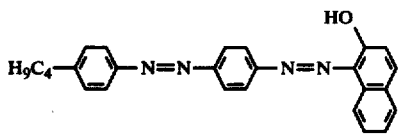

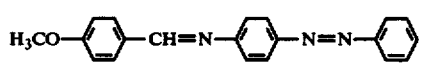

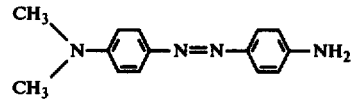

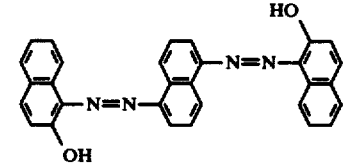

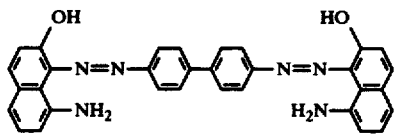

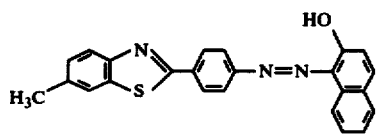

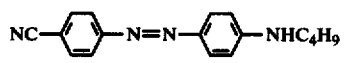

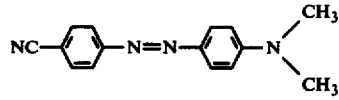

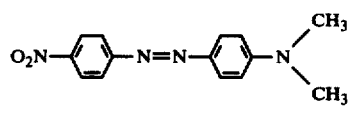

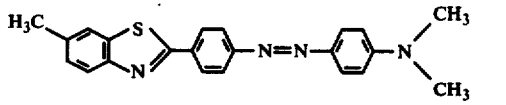

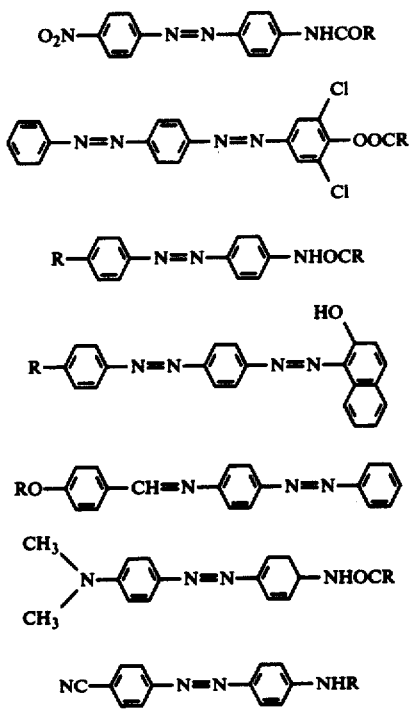

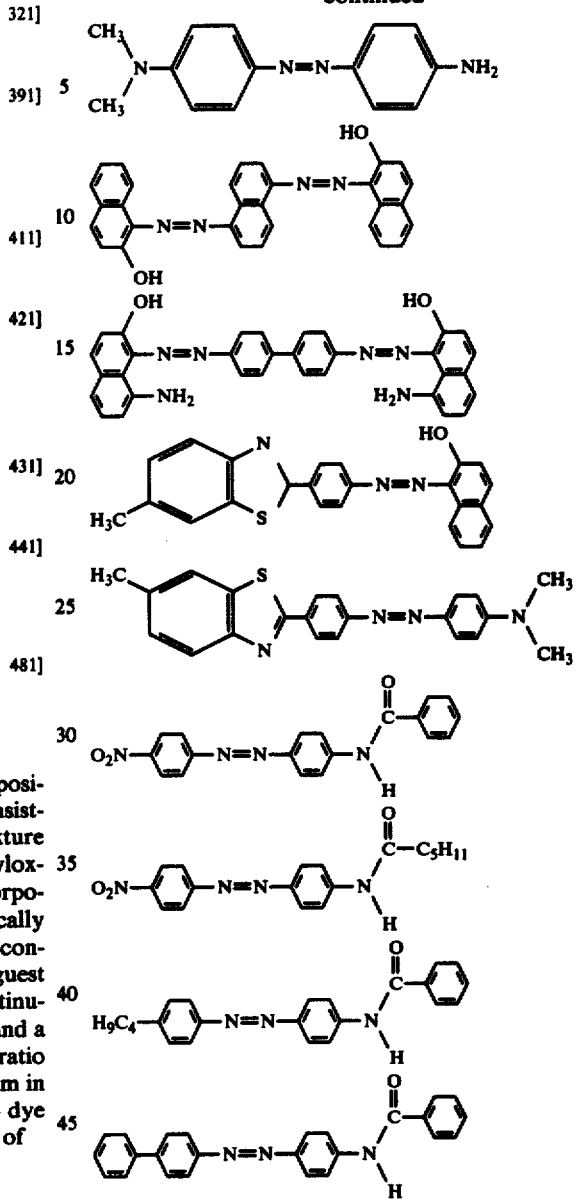

We claim:

1. In a cholesteric guest-host liquid crystal composition having a positive dielectric anisotropy and consisting of a nematic host component composed of a mixture of N-p-butoxy-, N-p-hexyloxy-, and N-p-octanoyloxy-ybenzylideneaminobenzonitrile with a dye incorporated as a guest component therein and an optically active (cholesteric) component, the improvement consisting of at least one water insoluble azo dye guest component which is stable under conditions of continuous operation at an applied ac voltage of 20 volts and a temperature of 100° C. and which has a pleochroic ratio $a_1/a_2$ of greater than 6.5 and an absorption maximum in the range of from 350 to 700 nm, wherein said azo dye is a compound selected from the group consisting of

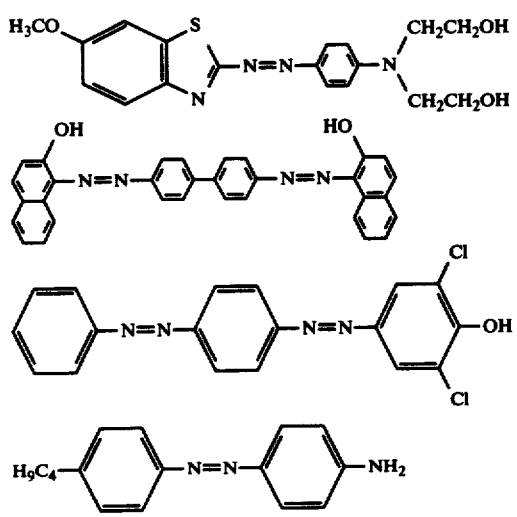

2. The liquid crystal composition of claim 1, wherein said azo dye is

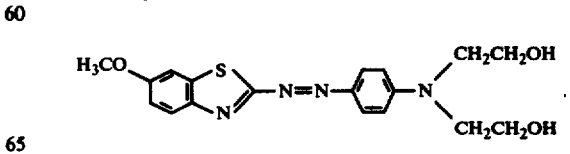

3. The liquid crystal composition of claim 1, wherein said azo dye is

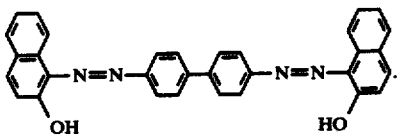

4. The liquid crystal composition of claim 1, wherein said azo dye is

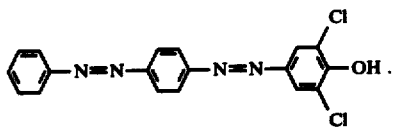

5. The liquid crystal composition of claim 1, wherein said azo dye is

6. The liquid crystal composition of claim 1, wherein said azo dye is

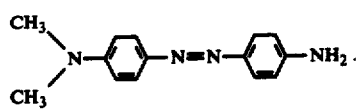

7. The liquid crystal composition of claim 1, wherein said azo dye is

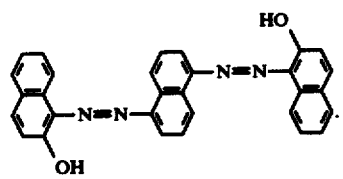

8. The liquid crystal composition of claim 1, wherein said azo dye is

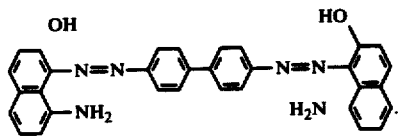

9. The liquid crystal composition of claim 1, wherein said azo dye is

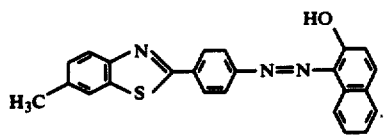

10. The liquid crystal composition of claim 1, wherein said azo dye is

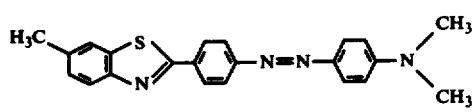

11. The liquid crystal composition of claim 1, wherein said azo dye is selected from the group consisting essentially of compounds having the formulae

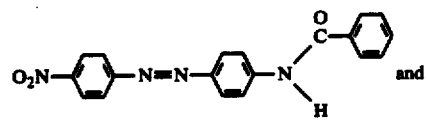 and

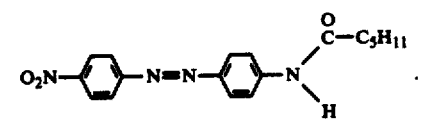

12. The liquid crystal composition of claim 1, wherein said azo dye is selected from the group consisting essentially of compounds having the formulae

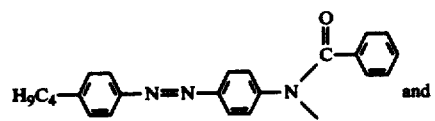 and

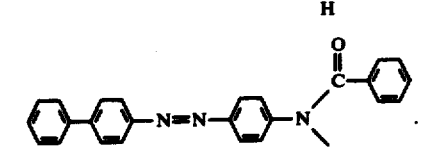

13. The liquid crystal composition of claim 1, wherein said azo dye is

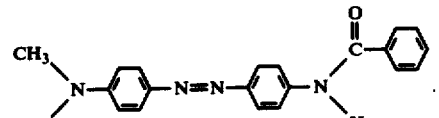

* * * * *